US006938735B1

(12) United States Patent
Hilzinger

(10) Patent No.: US 6,938,735 B1
(45) Date of Patent: Sep. 6, 2005

(54) ELECTROMECHANICAL WHEEL BRAKE DEVICE

(75) Inventor: Juergen Hilzinger, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 23 days.

(21) Appl. No.: 10/239,688

(22) PCT Filed: Nov. 23, 2000

(86) PCT No.: PCT/DE00/04147

§ 371 (c)(1),
(2), (4) Date: Mar. 24, 2003

(87) PCT Pub. No.: WO01/73311

PCT Pub. Date: Oct. 4, 2001

(30) Foreign Application Priority Data

Mar. 25, 2000 (DE) ................................ 100 14 993

(51) Int. Cl.[7] ............................................. F16D 65/16
(52) U.S. Cl. ..................... 188/72.1; 188/158; 188/162; 188/156; 188/72.8
(58) Field of Search .............................. 188/72.1, 156, 188/158, 162, 72.8, 72.7, 71.2, 161; 303/20; 310/77, 83, 93, 216, 254

(56) References Cited

U.S. PATENT DOCUMENTS

| | | | |
|---|---|---|---|
| 4,546,297 A | * | 10/1985 | Washbourn et al. ........ 318/372 |
| 5,655,636 A | * | 8/1997 | Lang et al. .................. 192/223 |
| 6,340,077 B1 | * | 1/2002 | Schaffer ...................... 188/156 |
| 6,806,602 B2 | * | 10/2004 | Hilzinger et al. ............. 310/77 |
| 2004/0036370 A1 | * | 2/2004 | Hilzinger et al. ............. 310/83 |

FOREIGN PATENT DOCUMENTS

| | | | |
|---|---|---|---|
| DE | 19750273 | * | 5/1999 |
| DE | 19817892 | * | 10/1999 |
| DE | 010014993 A1 | * | 9/2001 |
| WO | WO 01/73311 A1 | * | 10/2001 |

OTHER PUBLICATIONS

Translation of submitted de19817892.*

* cited by examiner

Primary Examiner—Douglas C. Butler
(74) Attorney, Agent, or Firm—Ronald E. Greigg

(57) ABSTRACT

An electromechanical wheel brake device has a helical gear for converting the rotating motion of an electric motor into a translating motion of a brake piston in order to press a brake pad against a brake disc in an advancing stroke or in order to release the brake pad in a restoring stroke. In addition, a clutch is provided, which operatively disengages a part of the helical gear from the electric motor should a permissible restoring stroke be exceeded. This prevents a mechanical failure or damage to the wheel brake device in the event of such a malfunction. The electromechanical wheel brake device can be used in motor vehicles such as cars.

7 Claims, 2 Drawing Sheets

ELECTROMECHANICAL WHEEL BRAKE DEVICE

CROSS-REFERENCE TO RELATED APPLICATIONS

This application is a 35 USC 371 application of PCT/DE 00/04147, filed on Nov. 23, 2000.

BACKGROUND OF THE INVENTION RECEIVED

1. Field of the Invention

The invention relates to an electromechanical wheel brake device for a motor vehicle, including a helical gear driven by an electric motor for applying and releasing the brakes.

2. Description of the Prior Art

A wheel brake device is already known (DE 197 50 273 A1), in which a threaded spindle, which is part of a planetary roller screw drive and can be moved in the longitudinal direction by a nut driven to rotate by an electric motor, is used to press a brake pad against a brake disc. The threaded spindle is comprised of two parts that axially interlock in a positively engaging manner. During normal operation of the wheel brake device, an inner part of the threaded spindle is kept axially and rotationally stationary by an electromagnetically actuat d clutch; an outer part is guided on the inner part in a longitudinally mobile fashion. To avoid damage to the wheel brake device in the event of an incorrect continuous supply of power to the electric motor in the restoring stroke of the outer threaded spindle part, the clutch can also be mechanically switched by this part of the threaded spindle. As a result, the threaded spindle can rotate freely and is operatively disengaged from the electric motor.

SUMMARY OF THE INVENTION

The electromechanical wheel brake device according to the invention has the advantage over the prior art that the clutch for disengaging the electric motor from the threaded spindle is comprised of fewer components than the known embodiment. This reduces both the weight and the required installation space of the wheel brake device. The reduced number of components also improves the operational safety of the wheel brake device.

Advantageous modifications and improvements of the electromechanical wheel brake device are disclosed.

One embodiment of the electromechanical wheel brake device allows the clutch to be engaged by simply reversing the rotation direction of the electric motor.

BRIEF DESCRIPTION OF THE DRAWINGS

An exemplary embodiment of the invention is described herein below, with reference to the drawings, in which.

DESCRIPTION OF THE PREFERRED EMBODIMENT

Figure 1:
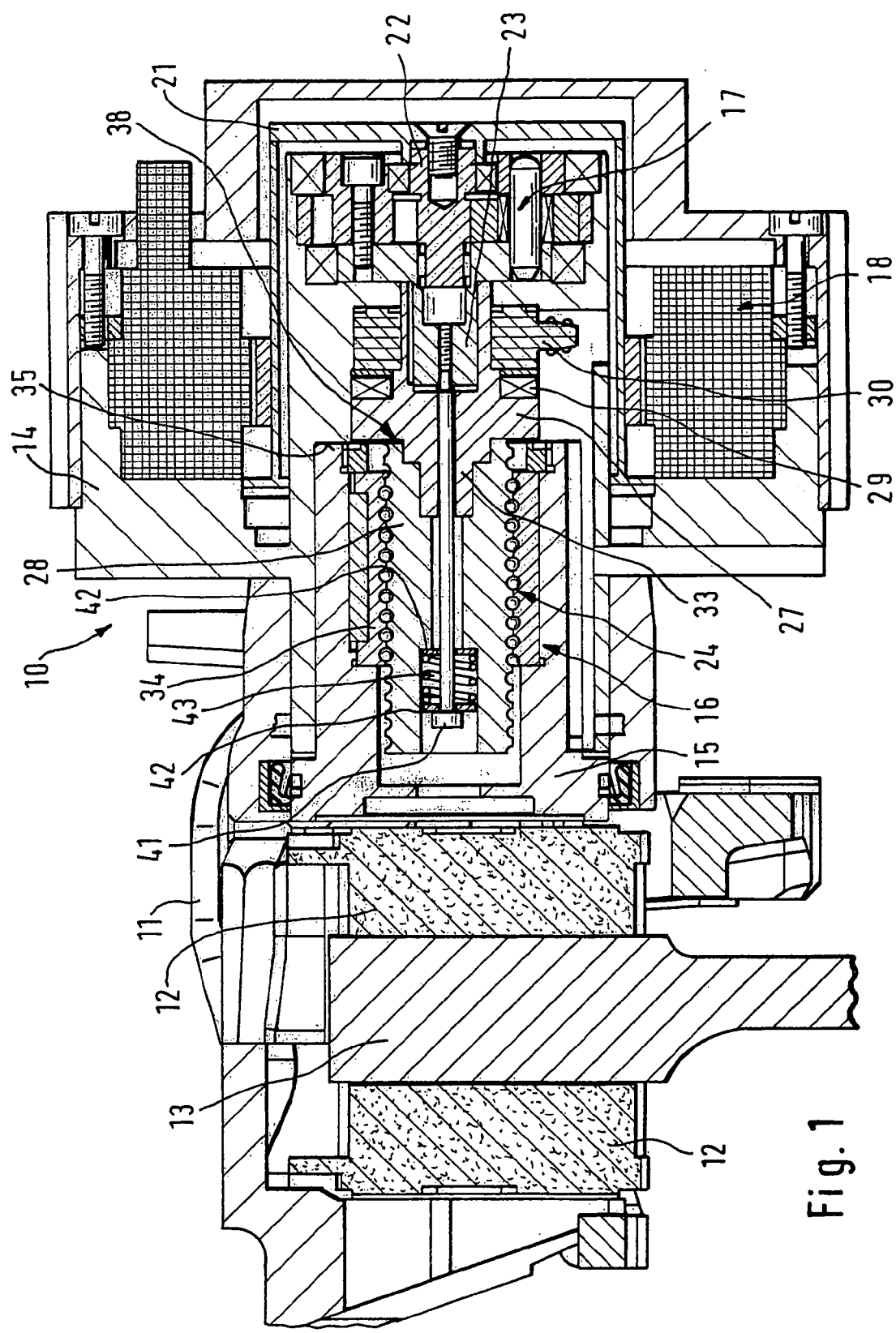
FIG. 1 shows a longitudinal section through an electromechanical wheel brake device with a clutch in a threaded spindle and FIG. 2 shows an enlarged detail of FIG. 1 with a clutch released from the threaded spindle.

An electromechanical wheel brake device 10 for motor vehicles shown in the drawings is embodied as a disc brake. It has a floating caliper 11, in which two brake pads 12 are mounted one on either side of a brake disc 13, which functions as a rotating friction element. To press the brake pads 12 against the brake disc 13 and to release the brake pads from the brake disc, a longitudinally mobile brake piston 15 is disposed in the housing 14, which is connected to the floating caliper 11. The housing 14 also contains a helical gear 16 for displacing the brake piston 15, a reduction gear 17 connected to the helical gear 16, and an electric motor 18.

The electric motor 18, not shown in detail, has a rotor 21, which is nonrotatably connected to an input member 22 of the reduction gear 17, which is embodied as a planetary gear. The reduction gear 17 has an output member 23 for the torque transmitting engagement with a threaded spindle 24 of the helical gear 16, which is embodied as a ball screw.

The threaded spindle 24 is comprised of two parts 27 and 28, which interlock by means of positive engagement. The threaded spindle part 27 disposed oriented toward the reduction gear 17 is supported in the housing 14 of the wheel brake device 10 by an axial bearing 29 so that it can rotate, but cannot move axially. A force sensor 30 for detecting the brake force applied to the brake disc 13 by the brake pads 12 is disposed between the housing 14 and the axial bearing 29 of the threaded spindle part 27, which is nonrotatably connected to the output member 23 of the reduction gear 17.

The threaded spindle part 27 is equipped with a stepped journal 33 on the side oriented away from the output member 23. The threaded spindle part 28, which extends inside the brake piston 15, is supported on this journal 33. A nut 34 is associated with this threaded spindle part 28 and is connected to the brake piston 15 in an axially fixed, nonrotating fashion. A restoring stroke limiting stop 35 of the housing 14 of the wheel brake device 10 is associated with the brake piston 15 on its side oriented away from the brake disc 13. In actual use, the brake piston 15 assumes a position spaced apart from the stop 35; the distance of this spacing depends on the wear on the brake pads 12 and the brake disc 13 as well as the clearance between the brake pads and the brake disc.

The above-mentioned positive engagement between the two parts 27 and 28 of the threaded spindle 24 is produced by a clutch 38, which can be embodied as a denture clutch or claw clutch. The clutch is embodied along the circumference of the journal 33 and/or at the end of the two parts 27 and 28 of the threaded spindle 24. In the position shown in FIG. 1, the threaded spindle part 28 guided on the journal 33 is nonrotatably connected to the threaded spindle part 27 by means of the engaged clutch 38.

A connection rod 41, which is shaped as a fillister head screw, passes through the center of the two threaded spindle parts 27 and 28 and is screwed into the output member 23 of the reduction gear 17. Two washers 42 with a prestressed compression spring 43 between them are disposed at the head of the axially stationary connection rod 41. The compression spring 43 exerts spring force on the threaded spindle part 28 in the direction of the threaded spindle part 27. The clutch 38 can be disengaged by overcoming the spring force.

The electromechanical wheel brake device 10 functions as follows:

The electric motor 18 is supplied with power to actuate the wheel brake device 10. The rotating motion of the rotor 21 is transmitted to the threaded spindle 24 of the helical gear 16 by means of the reduction gear 17. The helical gear 16 converts the rotating motion into a translating motion of the brake piston 15. The brake piston 15 presses the two brake pads 12 against the brake disc 13 in a known fashion.

To release the wheel brake device 10, the electric motor 18 is supplied with power so that it reverses its rotation direction. The brake piston 15, which is guided back into the housing 14, lifts the brake pads 12 off of the brake disc 13. During proper operation of the wheel brake device 10, the brake piston 15 does not reach the stop 35 of the housing 14.

Figure 2:
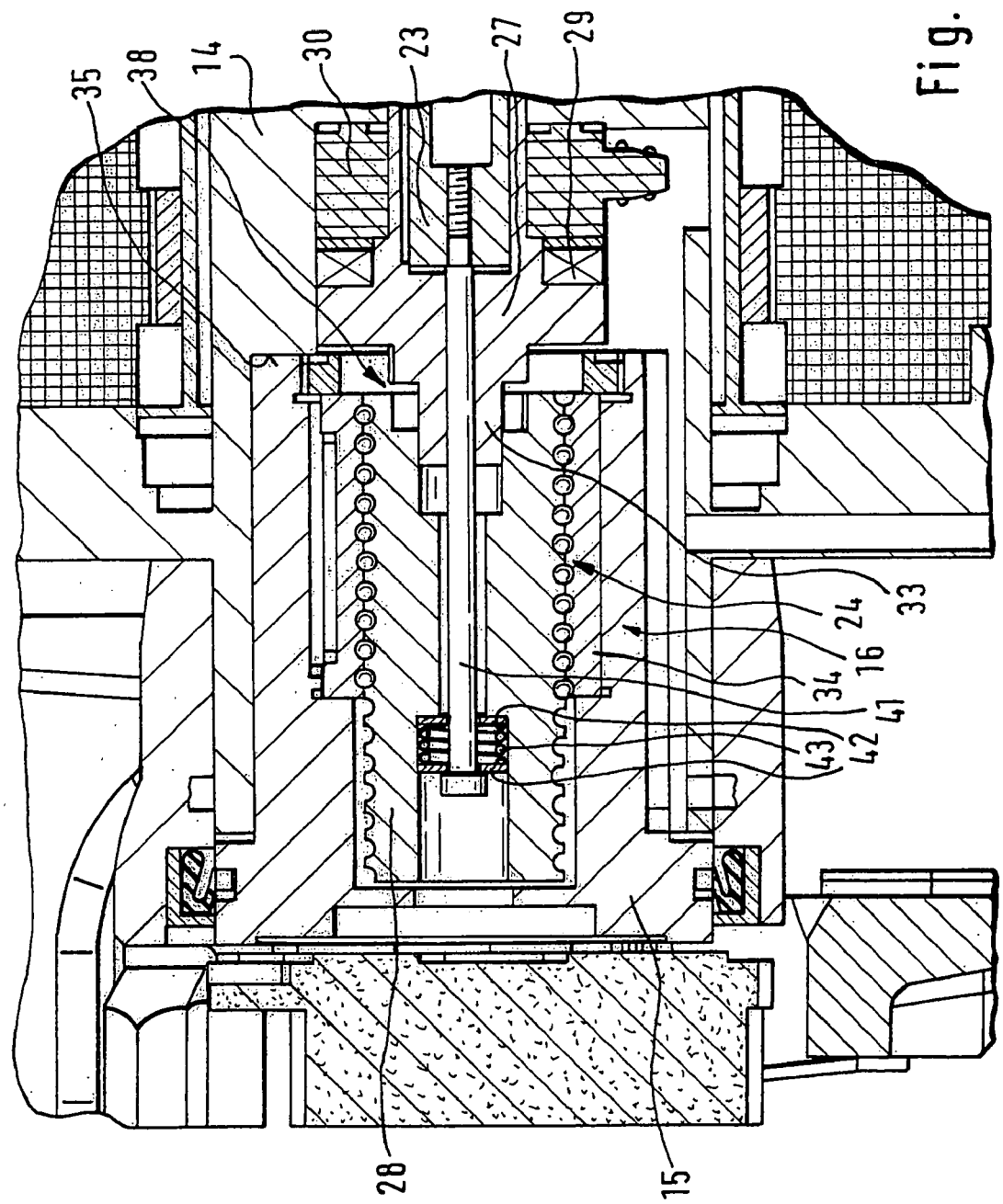

However, in the event that the power supply to electric motor 18 remains turned on due to a malfunction, then the brake piston 15 strikes against the stop 35. Consequently, the continuously propelled threaded spindle part 28 is screwed into the axially fixed, nonrotatable nut 34 in the direction of the brake disc 13. The longitudinal movement of the threaded spindle part 28 on the journal 33 of the axially fixed threaded spindle part 27, which movement occurs counter to the force of compression spring 43, causes the clutch 38 to disengage after a limited distance. This position is shown in FIG. 2. The lack of positive engagement between the two parts 27 and 28 of the threaded spindle 24 releases the threaded spindle part 28, which is disposed on the side of the nut, from the electric motor drive, thus preventing overload and destruction of the wheel brake device 10.

Upon elimination of the electric malfunction, the electric motor 18 is operated to actuate the brake device; this resets the threaded spindle part 28 due to the frictional engagement of the connection rod 41 and the threaded spindle part 28 and restores the positive engagement with the threaded spindle part 27.

The foregoing relates to the preferred exemplary embodiments of the invention, it being understood that other variants and embodiments are possible within the spirit and scope of the invention, the latter being defined by the appended claims.

I claim:

1. In a electromechanical wheel brake device (10) for a motor vehicle with an electric motor (18) for actuating and releasing the wheel brake device (10), with a helical gear (16) converting the rotating motion of the electric motor (18) into a translating motion in order to press a brake pad (12) against a brake disc (13) and release it from the brake disc, the helical gear (16) having a nut (34) and a threaded spindle (24), the threaded spindle being comprised of a first part (27) and a second part (28) that interlock by means of positive engagement, with a clutch (38), which can be at least indirectly actuated in the event of a malfunction-induced release of the brake pad (12) from brake disc (13) and which operatively disengages the electric motor (18) from the second part (28) of the threaded spindle (24), the improvement wherein:

the electric motor (18) engages the first part (27) of the threaded spindle (24), the second part (28) of the threaded spindle (24) engages with the nut (34) of the helical gear (16), the nut (34) of the helical gear (16) is moveable in the longitudinal direction along the threaded spindle (24) and is at least indirectly associated with a stop (35), which limits a restoring stroke, and the first and second parts (27, 28) of the threaded spindle (24) are disengaged by means of the clutch (38) when the nut (34) of the helical gear (16) engages at least indirectly with the stop (35).

2. The electromechanical wheel brake device according to claim 1 wherein the first part (27) of the threaded spindle (24) is supported in an axially stationary manner in a housing (14) of the wheel brake device (10), while the second part (28) of the threaded spindle (24), which engages with the nut (34) of the helical gear (16), can be operatively disengaged from the first part (27) in an axially moveable fashion counter to a spring force.

3. The electromechanical wheel brake device according to claim 2 further comprising an axially fixed connection rod (41) passing through the center of the second part (28) of the threaded spindle (24) and having a compression spring (43), which loads the second part (28) with a spring force oriented toward the first part (27) of the threaded spindle (24).

4. The electromechanical wheel brake device according to claim 1 wherein the second part (28) of the threaded spindle (24), on its side oriented toward the clutch, is guided in a longitudinally mobile fashion on a journal (33) of the first part (27) of the threaded spindle (24).

5. The electromechanical wheel brake device according to claim 2 wherein the second part (28) of the threaded spindle (24), on its side oriented toward the clutch, is guided in a longitudinally mobile fashion on a journal (33) of the first part (27) of the threaded spindle (24).

6. The electromechanical wheel brake device according to claim 4 wherein the clutch (38) is embodied along the circumference of the journal (33) and/or at the end of the first and second parts (27, 28) of the threaded spindle (24).

7. The electromechanical wheel brake device according to claim 5 wherein the clutch (38) is embodied along the circumference of the journal (33) and/or at the end of the first and second parts (27, 28) of the threaded spindle (24).

* * * * *